(12) United States Patent
Duncan et al.

(10) Patent No.: US 10,753,796 B1
(45) Date of Patent: Aug. 25, 2020

(54) PHOTONIC INTEGRATED CIRCUIT OPTICAL SPECTROMETER

(71) Applicant: LOCKHEED MARTIN CORPORATION, Bethesda, MD (US)

(72) Inventors: Alan Lee Duncan, Sunnyvale, CA (US); Richard Lee Kendrick, San Mateo, CA (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 123 days.

(21) Appl. No.: 15/724,187

(22) Filed: Oct. 3, 2017

Related U.S. Application Data

(60) Provisional application No. 62/405,841, filed on Oct. 7, 2016.

(51) Int. Cl.
| | |
|---|---|
| *G01J 3/18* | (2006.01) |
| *G01N 21/359* | (2014.01) |
| *G01N 21/25* | (2006.01) |
| *G01J 3/28* | (2006.01) |
| *G01J 3/02* | (2006.01) |
| *G02B 6/12* | (2006.01) |

(52) U.S. Cl.
CPC ........... *G01J 3/1895* (2013.01); *G01J 3/0208* (2013.01); *G01J 3/0232* (2013.01); *G01J 3/2823* (2013.01); *G01N 21/255* (2013.01); *G01N 21/359* (2013.01); *G02B 6/12009* (2013.01); *G01J 2003/2826* (2013.01); *G01N 2201/0873* (2013.01)

(58) Field of Classification Search
CPC .... G01J 3/1895; G01J 3/2823; G02B 6/12009
See application file for complete search history.

(56) References Cited

U.S. PATENT DOCUMENTS

| | | | |
|---|---|---|---|
| 9,372,306 B1* | 6/2016 | Nagarajan | G02B 6/12004 |
| 9,722,706 B1* | 8/2017 | Liu | G02B 6/12011 |
| 2008/0094626 A1* | 4/2008 | Becker-Ross | G01J 3/02 356/328 |
| 2010/0171953 A1* | 7/2010 | Becker-Ross | G01J 3/02 356/328 |
| 2016/0091368 A1* | 3/2016 | Fish | G01J 3/1895 356/328 |

OTHER PUBLICATIONS

S. Pathak, P. Dumon, D. Van Thourhout and W. Bogaerts, "Comparison of AWGs and Echelle Gratings for Wavelength Division Multiplexing on Silicon-on-Insulator," in IEEE Photonics Journal, vol. 6, no. 5, pp. 1-9, Oct. 2014, (Year: 2014).*

(Continued)

*Primary Examiner* — Dominic J Bologna
(74) *Attorney, Agent, or Firm* — Morgan, Lewis & Bockius LLP

(57) ABSTRACT

An apparatus includes multiple photonic integrated circuit (PIC) optical spectrometers, and an imaging plane coupled to the PIC optical spectrometers. Each PIC optical spectrometer includes multiple semiconductor chip layers. Each semiconductor chip layer includes multiple arrayed waveguide gratings (AWGs) and a number of on-chip optical detectors.

10 Claims, 5 Drawing Sheets

(56) References Cited

OTHER PUBLICATIONS

Ryckeboer, Eva, et al. "Cmos-compatible silicon nitride spectrometers for lab-on-a-chip spectral sensing." Silicon Photonics and Photonic Integrated Circuits V. vol. 9891. International Society for Optics and Photonics, 2016. (Year: 2016).*

Selvaraja, Shankar Kumar, et al. "Low-loss amorphous silicon-on-insulator technology for photonic integrated circuitry." Optics Communications282.9 (2009): 1767-1770. (Year: 2009).*

* cited by examiner

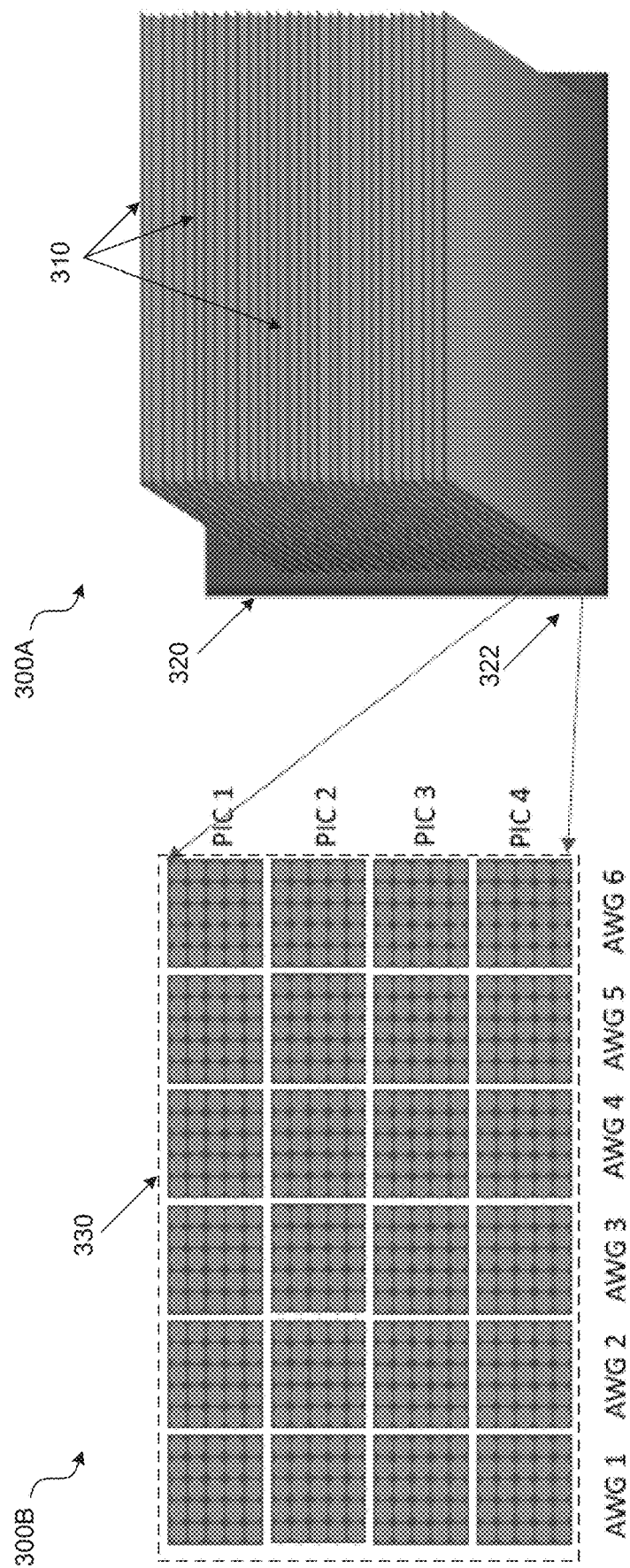

US 10,753,796 B1

PHOTONIC INTEGRATED CIRCUIT OPTICAL SPECTROMETER

CROSS-REFERENCE TO RELATED APPLICATIONS

This application claims the benefit of priority under 35 U.S.C. § 119 from U.S. Provisional Patent Application 62/405,841 filed Oct. 7, 2016, which is incorporated herein by reference in its entirety.

STATEMENT REGARDING FEDERALLY SPONSORED RESEARCH OR DEVELOPMENT

Not applicable

FIELD OF THE INVENTION

The present invention generally relates to spectrometers, and more particularly, to a photonic integrated circuit (PIC) optical spectrometer.

BACKGROUND

Planar waveguide spectrometers, such as arrayed waveguide gratings (AWGs) and waveguide echelle gratings are commonly used in wavelength division multiplexed (WDM) communication networks. Integrated spectrometer devices have been used in a wider range of spectrometry applications that are not demanding on spectral resolution. For example, applications in medical instrumentation, genomics, chemical and biological sensing, and optical metrology such as space-born environmental sensing from micro- and nano-satellite platforms may use Raman or infrared absorption spectroscopy techniques. Compact, monolithic optical micro-spectrometers capable of the high-resolution are essential components of Raman and infrared absorption spectroscopy.

Miniature near-infrared (NIR) spectrometers can be used in large telescopes for astrophotonics applications. AWGs are considered a promising photonic technology for such large telescopes, as they can satisfy the target requirement for the spectrograph including resolving power, low crosstalk between adjacent on-chip wavelength channels, wide spectral range, and high on-chip throughput. Current large-format, high-resolution imaging spectrometers such as NIR spectrometers are quite expensive due to high size, weight, and power requirements (SWaP).

SUMMARY

According to various aspects of the subject technology, methods and configuration are disclosed for providing a photonic integrated circuit (PIC) optical spectrometer. The PIC optical spectrometer of the subject technology is an imaging spectrometer that can be located at the image plane of a conventional telescope.

In one or more aspects, an apparatus includes multiple photonic integrated circuit (PIC) optical spectrometers, and an imaging plane coupled to the PIC optical spectrometers. Each PIC optical spectrometer includes multiple semiconductor chip layers. Each semiconductor chip layer includes multiple arrayed waveguide gratings (AWGs) and a number of on-chip optical detectors.

In other aspects, a method includes providing a plurality of multi-layer PIC spectrometers by implementing each multi-layer PIC spectrometer on multiple semiconductor chip layers, and implementing a number of AWGs on each semiconductor chip layer. An imaging plane may be coupled to the multi-layer PIC spectrometers.

In yet other aspects, a photonic spectrometer includes a number of multi-layer PIC spectrometers. Each multi-layer PIC spectrometer includes multiple semiconductor chip layers. Each semiconductor chip layer includes a number of AWGs. Multiple on-chip optical detectors are coupled to the AWGs and are configured to convert optical signals from the AWGs to electrical signals.

The foregoing has outlined rather broadly the features of the present disclosure in order that the detailed description that follows can be better understood. Additional features and advantages of the disclosure will be described hereinafter, which form the subject of the claims.

BRIEF DESCRIPTION OF THE DRAWINGS

For a more complete understanding of the present disclosure, and the advantages thereof, reference is now made to the following descriptions to be taken in conjunction with the accompanying drawings describing specific aspects of the disclosure, wherein:

FIGS. 3A-3B are diagrams illustrating front and rear views of an example PIC optical spectrometer, according to certain aspects of the disclosure.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and can be practiced using one or more implementations. In one or more instances, well-known structures and components are shown in block diagram form in order to avoid obscuring the concepts of the subject technology.

In some aspects of the present technology, methods and configurations are described for providing a photonic integrated circuit (PIC) optical spectrometer. The PIC optical spectrometer of the subject technology uses PICs that allow reducing SWaP requirements by about 10-100 times and substantially reducing the production cost of the spectrometer. In some implementations of the subject technology, a micro-shutter array, followed by a lenslet array, couples light (e.g., directly) into a stack of photonic integrated circuits (PICs). Optical waveguides in the PICs inject the light into arrayed waveguide gratings (AWGs) that can disperse the light into spectral bins. Each spectral bin is then routed by a waveguide to a detector located on the PIC. The disclosed solution can leverage existing single or multiple channel AWG spectrometers and optical fiber coupled spectrometers that are limited to a small number of channels to package large numbers of AWG spectrometer channels in a small volume. Using multi-layer PICs enables making PIC optical spectrometers with a substantially low size, weight, and power (SWaP).

Figure 1A:
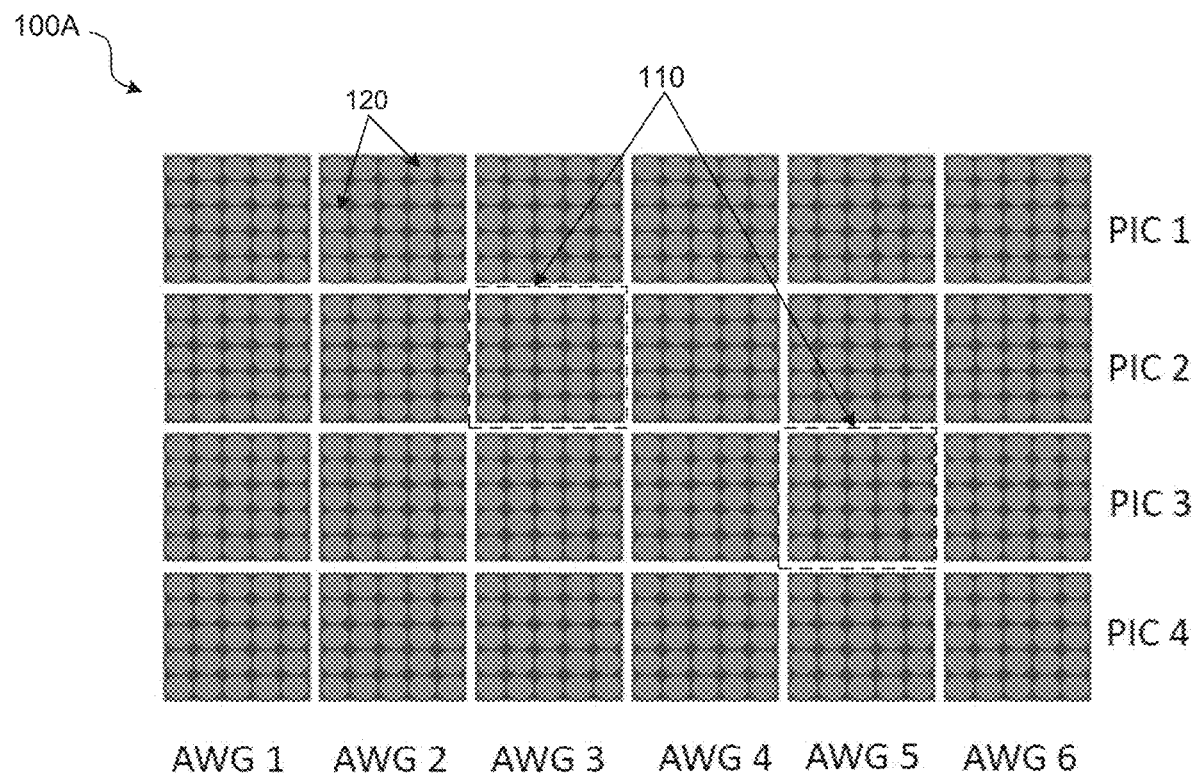
FIGS. 1A-1B are diagrams illustrating top and side views of an example photonic integrated circuit (PIC) optical spectrometer, according to certain aspects of the disclosure.
Figure 1B:
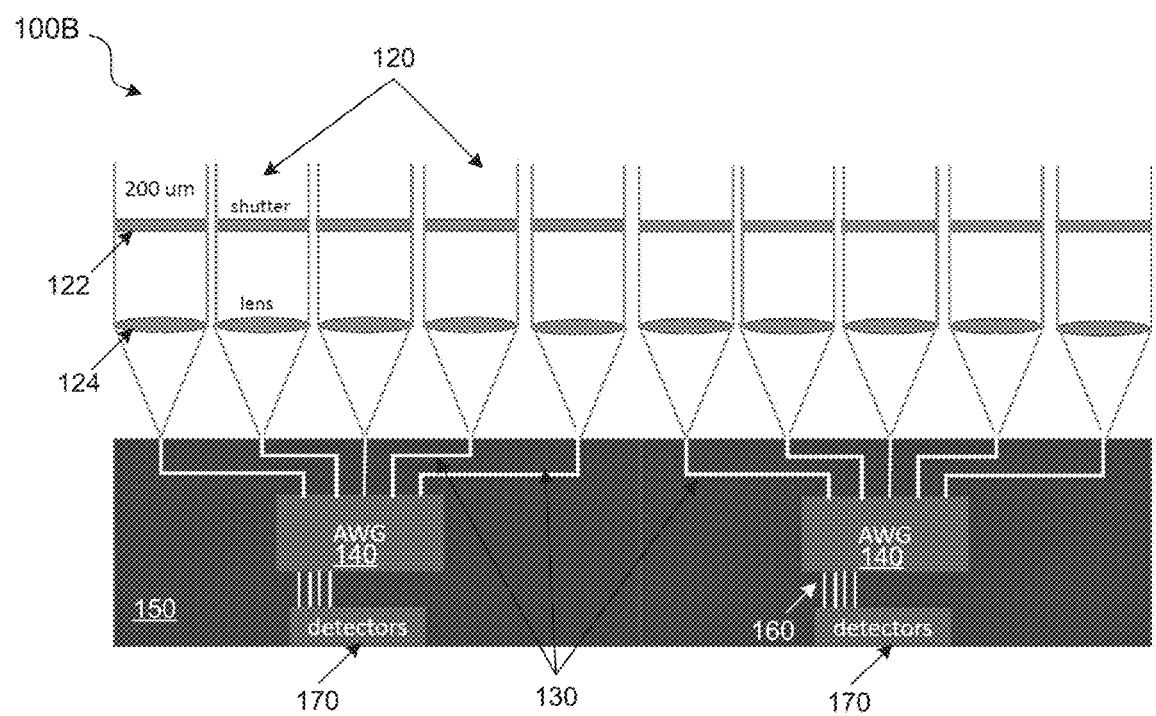

FIGS. 1A-1B are diagrams illustrating top and side views of an example photonic integrated circuit (PIC) optical spectrometer, according to certain aspects of the disclosure. FIG. 1A depicts examples of a top view 100A of a portion of a telescope. The top view 100A shows multiple collimator blocks 110 corresponding to a number of (e.g., 6) arrayed waveguide gratings (AWGs) of several (e.g., 4) PIC optical spectrometers (hereinafter "PICs") of a PIC optical spectrometer apparatus or system (hereinafter "PIC apparatus"). The PIC apparatus may include a larger number of PICs and each PIC may include a larger number of AWGs. In some implementations, the number of PICs in a PIC apparatus may be within a range of about 30-50 (e.g., about 35), of which only six PICs (e.g., PIC1 through PIC6) are shown. In some implementations, the number of AWGs of a PIC may be within a range of about 30-50 (e.g., about 35), of which only six AWGs (e.g., AWG1 through AWG 6) are shown. Each collimator block 110 includes multiple micro collimator channels 120. In some implementations, the number of micro collimator channels 120 in each collimator block 110 is within a range of about 16-36 (e.g., 25).

The Side view 100B shown in FIG. 1B illustrates a number of (e.g., 5) micro collimator channels 120 coupled to each AWG 140. Each micro collimator channel 120 includes a shutter 122 and a micro-lens (lenslet) 124. The shutter 122 may be a micro-electromechanical system (MEMS) shutter and can be operable to actively select inputs to a number of spectrometer channels (e.g., input waveguides of the AWGs 140). In some implementations, the micro collimator channels 120 may have a diameter within a range of about 150-250 μm. Each micro collimator channel 120 is configured to concentrate incoming light of each channel into a respective input waveguide 130 of the AWG 140.

Also shown in FIG. 1B is the PIC 150, which can be made of a semiconductor material such as silicon (Si), silicon nitride ($Si_3N_4$), sapphire ($\alpha$-$Al2O3$) or other suitable semiconductor material based on operating wavelength of the PIC. The AWGs 140 and their respective input waveguides 130 and output waveguides 160 are implemented in the semiconductor chip. Each output waveguide 160 is coupled to an optical detector channel (e.g., a photo-diode or a photo-transistor) that can convert the optical signal of the channel to an electrical signal. The optical detector channels can be integrated into one or more photodetectors 170 coupled to the output waveguides 160 of the AWGs 140. The electrical signals from the photodetectors 170 can be processed by electronic integrated circuits (ICs) that can, in some implementations, be realized on the same semiconductor chip that the PIC 150 is implemented on. In some implementations, the electronic ICs can be coupled to the PIC 150, via, for example, a flip-chip bonding technique.

Figures 2A, 2B:
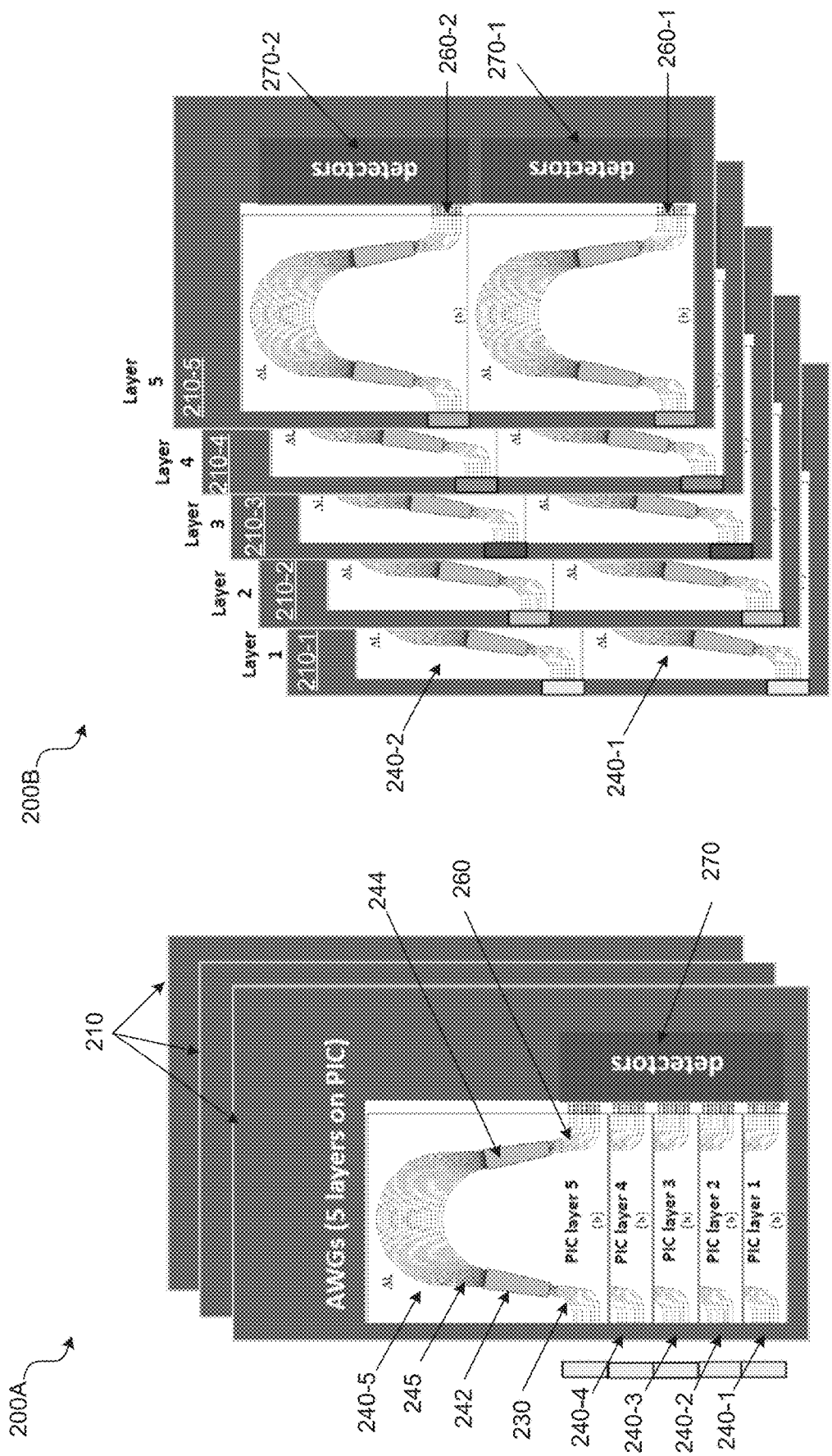
FIGS. 2A-2B are schematic diagrams illustrating multiple layers of example PIC optical spectrometers, according to certain aspects of the disclosure.

FIGS. 2A-2B are schematic diagrams illustrating multiple layers of example PICs 200A and 200B, according to certain aspects of the disclosure. The PIC 200A shown in FIG. 2A includes multiple layers (e.g., 3-7 such as 5) PIC layers 210 of which only three layers are shown for simplicity. Each layer 210 is implemented on a semiconductor chip and includes a number of (e.g., 5-9 such a as 7) AWGs 240, of which only five AWGs (e.g., AWGs 240-1 to 240-5) are shown. Each AWG 240 includes input ports (waveguides) 230, input waveguide slab 242, arrayed waveguides 245, output waveguide slab 244 and output ports (waveguides) 260, which are known by a person skilled in the art and can be implemented on a semiconductor chip. The light waves from each input port 230 are propagated through the free space provided by the input waveguide slab 242 into the arrayed waveguides 245. The waveguides of arrayed waveguides 245 have different lengths and thus can deliver light waves with different phase shift to the output waveguide slab 244 (e.g., another free space). The lights entering the output waveguide slab 244 with different phase shifts can interfere to form light waves with different wavelength (e.g., color) at different output ports 260. In one or more implementations, the AWGs 140 may include more than about 20 input ports (waveguides) and less than about 100 output ports (waveguides). The input ports 230 are coupled through the micro collimator channels (e.g., 120 of FIG. 1B) to an imaging plate of a telescope. The output ports 260 can be coupled to the optical detectors 270, as discussed above.

The PIC 200B shown in FIG. 2B includes multiple (e.g., 3-7) PIC layers 210, of which only five layers (e.g., 210-1 to 210-5) are shown for simplicity. Each PIC 210 includes a number of AWGs 240, of which only two AWGs 240-1 and 240-2 are shown for simplicity. In some implementations, output ports 260 (e.g., 260-1 and 260-2) of each AWG 240 (e.g., 240-1 or 240-2) is coupled to an optical detector 270 (e.g., 270-1 or 270.2). In some implementations, the photodiodes (or photo-transistors) coupled to individual ports of the output ports 260 can be integrated into a single optical detector.

FIGS. 3A-3B are diagrams illustrating a rear view 300A and a front view 300B of an example PIC optical spectrometer, according to certain aspects of the disclosure. The rear view 300A shown in FIG. 3A is a 3-dimensional (3-D) view of a PIC spectrometer apparatus including a number of (e.g., 35) PICs 310 arranged as parallel plates. The PICs 310 are coupled to an imaging plane 320. In some implementations, the imaging plane 320 is a charge-coupled device (CCD). The PICs 310 are similar to the PICs 200A and 200B of FIGS. 2A and 2B and each includes a multilayer PIC formed of a number (e.g., 5) of semiconductor layer, as discussed above. The front view 3B shown in FIG. 3B depicts a portion 330 of the actual front view of the PIC spectrometer apparatus and represents a number of (e.g., 6) AWGs of PICs1-4 of the apparatus. The front view 3B is the same as the top view 100A of FIG. 1A, described above. The portion 330 corresponds to a portion 322 of the image plane 320.

The PIC spectrometer apparatus of the subject technology is a light weight (e.g., about 2-5 Kg) and compact apparatus with dimensions within a range of about 30-50 mm, which is substantially lighter, smaller and lower cost as compared to the existing spectrometer apparatus. The disclosed PIC spectrometer apparatus can be utilized in applications demanding high-resolution such as Raman and infrared absorption spectroscopy and in large telescopes for astrophotonics applications.

Figure 4:
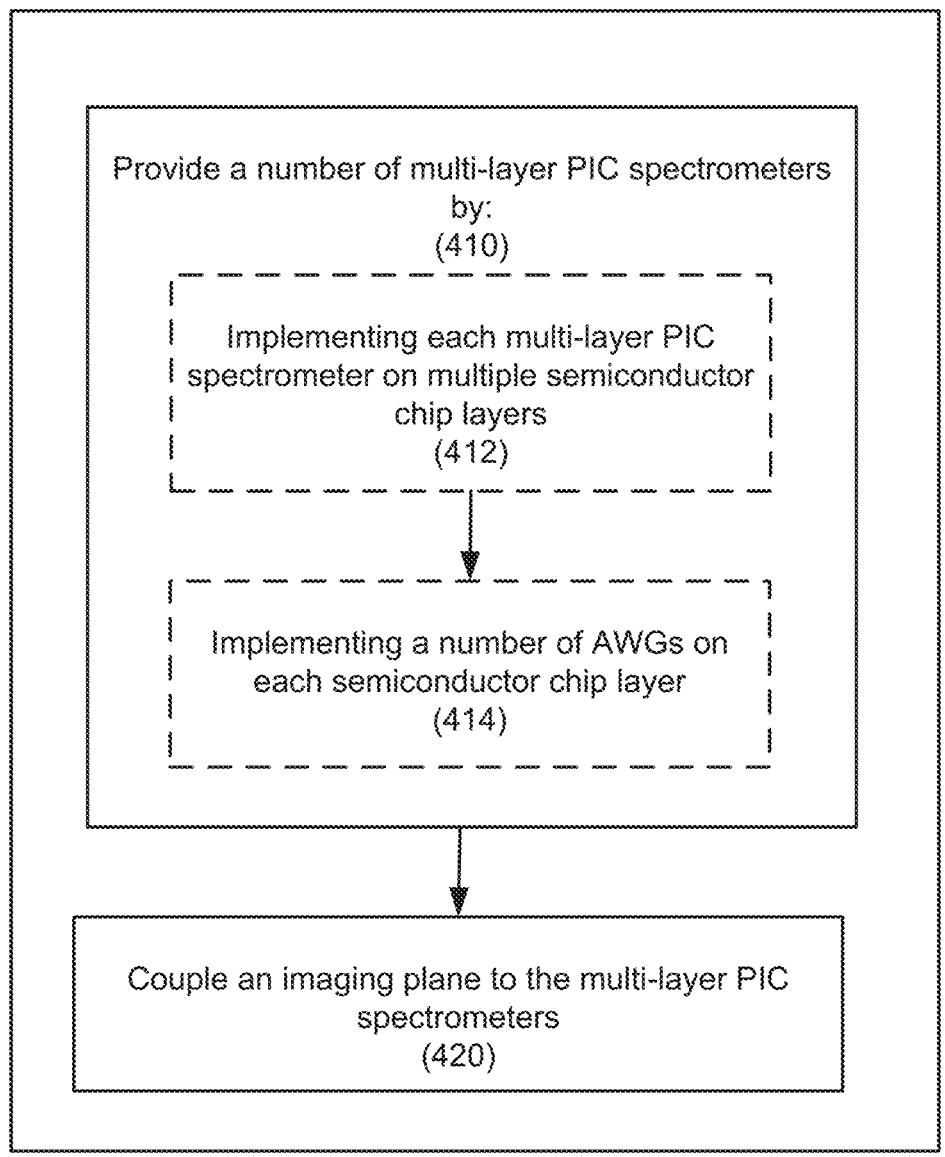
FIG. 4 is a flow diagram illustrating an example method of providing a PIC optical spectrometer, according to some aspects of the subject technology.

FIG. 4 is a flow diagram illustrating an example method 400 of providing a PIC optical spectrometer (e.g., 300A of FIG. 3A), according to some aspects of the subject technology. The method 400 includes providing a plurality of multi-layer PIC spectrometers (e.g., 310 of FIG. 3A) (410) by implementing each multi-layer PIC spectrometer on multiple semiconductor chip layers (e.g., Layers 1-5 of FIG. 2B) (412), and implementing a number of AWGs (e.g., 240 of FIGS. 2A and 2B) on each semiconductor chip layer (414). An imaging plane (e.g., 320 of FIG. 3A) may be coupled to the multi-layer PIC spectrometers (420).

Figure 5:
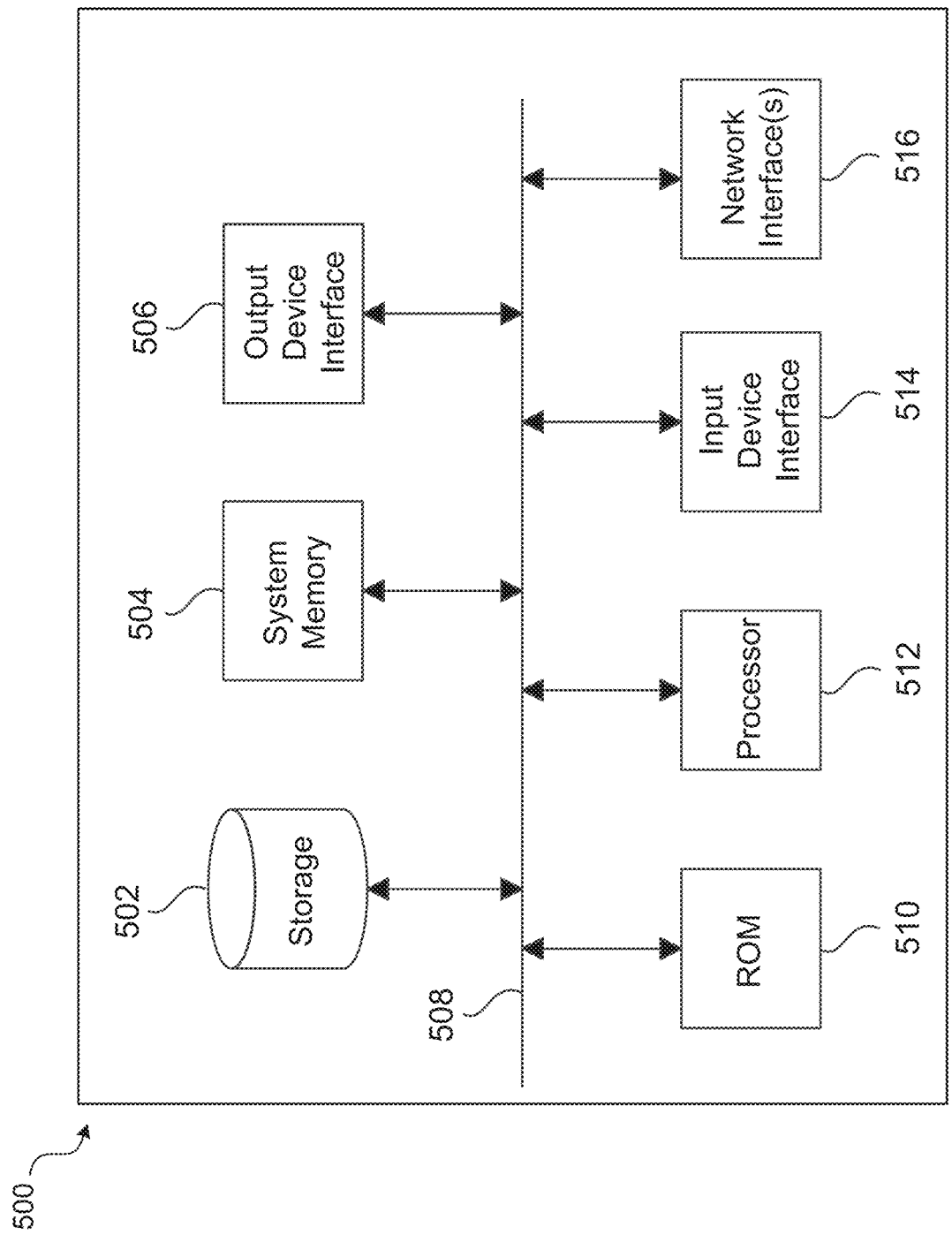
FIG. 5 is a block diagram conceptually illustrating an electronic system 500 with which aspects of the subject technology are implemented.

FIG. 5 is a block diagram conceptually illustrating an electronic system 500 with which aspects of the subject technology are implemented. The electronic system 500, for example, can be a network device, a media converter, a desktop computer, a laptop computer, a tablet computer, a server, a switch, a router, a base station, a receiver, a phone, or generally any electronic device that transmits signals over a network. Such an electronic system 500 includes various types of computer readable media and interfaces for various other types of computer readable media. In one or more implementations, the electronic system 500 can be, and/or can be a part of a telescope including the PIC spectrometer of FIG. 3A. The electronic system 500 includes a bus 508, one or more processing unit(s) 512, a system memory 504, a read-only memory (ROM) 510, a permanent storage device 502, an input device interface 514, an output device interface 506, and a network interface 516, or subsets and variations thereof.

The bus 508 collectively represents all system, peripheral, and chipset buses that communicatively connect the numerous internal devices of the electronic system 500. In one or more implementations, the bus 508 communicatively connects the one or more processing unit(s) 512 with the ROM 510, the system memory 504, and the permanent storage device 502. From these various memory units, the one or more processing unit(s) 512 retrieves instructions to execute and data to process in order to execute the processes of the subject disclosure. The one or more processing unit(s) 512 can be a single processor or a multi-core processor in different implementations. In some implementations, the one or more processing unit(s) 512 may process electrical signals from the electronic ICs coupled to the PIC spectrometers (e.g., 310 of FIG. 3A) of the subject technology.

The ROM 510 stores static data and instructions that are needed by the one or more processing unit(s) 512 and other modules of the electronic system. The permanent storage device 502, on the other hand, is a read-and-write memory device. The permanent storage device 502 is a non-volatile memory unit that stores instructions and data even when the electronic system 500 is off. One or more implementations of the subject disclosure use a mass storage device (such as a magnetic or optical disk and its corresponding disk drive) as the permanent storage device 502.

Other implementations use a removable storage device (such as a floppy disk, flash drive, and its corresponding disk drive) as the permanent storage device 502. Like the permanent storage device 502, the system memory 504 is a read-and-write memory device. However, unlike the permanent storage device 502, the system memory 504 is a volatile read-and-write memory, such as random access memory. System memory 504 stores any of the instructions and data that the one or more processing unit(s) 512 needs at runtime. In one or more implementations, the processes of the subject disclosure are stored in the system memory 504, the permanent storage device 502, and/or the ROM 510. From these various memory units, the one or more processing unit(s) 512 retrieves instructions to execute and data to process in order to execute the processes of one or more implementations.

The bus 508 also connects to the input device interface 514 and the output device interface 506. The input device interface 514 enables a user to communicate information and select commands to the electronic system. Input devices used with the input device interface 514 include, for example, alphanumeric keyboards and pointing devices (also called "cursor control devices"). The output device interface 506 enables, for example, the display of images generated by the electronic system 500. Output devices used with the output device interface 506 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 5, the bus 508 also couples the electronic system 500 to one or more networks (not shown) through one or more network interfaces 516. In this manner, the computer can be a part of one or more network of computers, such as a peer-to-peer network, a local area network ("LAN"), a wide area network ("WAN"), or an Intranet, or a network of networks, such as the Internet. Any or all components of the electronic system 500 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, eTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

The description of the subject technology is provided to enable any person skilled in the art to practice the various aspects described herein. While the subject technology has been particularly described with reference to the various figures and aspects, it should be understood that these are for illustration purposes only and should not be taken as limiting the scope of the subject technology.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various aspects described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Although the invention has been described with reference to the disclosed aspects, one having ordinary skill in the art will readily appreciate that these aspects are only illustrative of the invention. It should be understood that various modifications can be made without departing from the spirit of the invention. The particular aspects disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative aspects disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and operations. All numbers and ranges disclosed above can vary by some amount. Whenever a numerical range with a lower limit and an upper limit is disclosed, any number and any subrange falling within the broader range are specifically disclosed. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted.

What is claimed is:

1. An apparatus comprising:
   a multi-layer stack of photonic integrated circuit (PIC) optical spectrometers;
   an imaging plane coupled to the multi-layer stack of PIC optical spectrometers, wherein:
      each PIC optical spectrometer of the multi-layer stack of PIC optical spectrometers comprises multiple semiconductor chip layers, and
      each semiconductor chip layer comprises a plurality of arrayed waveguide gratings (AWGs); and
   a plurality of micro collimators, each comprising a lenslet and a micro-electromechanical system (MEMS) shutter, coupling input waveguides of each AWG of the plurality of AWGs to the imaging plane, wherein each MEMS shutter is configured to be operable to actively select inputs to a number of spectrometer channels of each AWG of the plurality of AWGs.

2. The apparatus of claim 1, wherein a material of at least some of the semiconductors chip layers comprises silicon, silicon nitride or sapphire.

3. The apparatus of claim 1, further comprising a plurality of on-chip optical detectors, wherein one or more on-chip optical detectors are coupled to output waveguides of the plurality of AWGs.

4. The apparatus of claim 1, wherein a count of layers of the multiple semiconductor chip layers is within a range of about 3-7 layers, and wherein a count of the plurality of AWGs is within a range of about 5-9 AWG per semiconductor chip layer.

5. The apparatus of claim 1, wherein a weight of the apparatus is within a range of about 2-5 Kg.

6. The apparatus of claim 1, wherein each AWG of the plurality of AWGs include more than about 20 input waveguides and less than about 100 output waveguides.

7. A method comprising:
providing a multi-layer stack of photonic integrated circuit (PIC) optical spectrometers by:
implementing each PIC optical spectrometer of the multi-layer stack of PIC optical spectrometers on multiple semiconductor chip layers, and
implementing a plurality of waveguide gratings (AWGs) on each semiconductor chip layer,
coupling an imaging plane to the multi-layer stack of PIC optical spectrometers;
coupling input waveguides of each AWG of the plurality of AWGs to the imaging plane using a plurality of micro collimators;
implementing each micro collimator of the plurality of micro collimators by using a lenslet and a microelectromechanical system (MEMS) shutter; and
configuring each MEMS shutter to be operable to actively select inputs to a number of spectrometer channels of each AWG of the plurality of AWGs.

8. The method of claim 7, further comprising:
implementing a plurality of on-chip optical detectors on each semiconductor chip layer; and
coupling an electronic integrated circuit (IC) to the plurality of on-chip optical detectors.

9. The method of claim 8, further comprising coupling one or more on-chip optical detectors to output waveguides of the plurality of AWGs.

10. The method of claim 7, wherein each multi-layer PIC spectrometer comprises about 3-7 layers of semiconductor chip layers, and wherein each semiconductor chip layer comprises about 5-9 AWGs.

* * * * *